United States Patent
Singhal et al.

(10) Patent No.: US 8,577,907 B1
(45) Date of Patent: *Nov. 5, 2013

(54) SEARCH QUERIES IMPROVED BASED ON QUERY SEMANTIC INFORMATION

(75) Inventors: Amit Singhal, Palo Alto, CA (US); Mehran Sahami, Redwood City, CA (US); John Lamping, Los Altos, CA (US); Marcin Kaszkiel, Santa Clara, CA (US); Monika H Henzinger, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,368

(22) Filed: Sep. 24, 2011

Related U.S. Application Data

(63) Continuation of application No. 10/377,117, filed on Mar. 3, 2003, now Pat. No. 8,055,669.

(51) Int. Cl.
  G06F 7/00 (2006.01)
  G06F 17/30 (2006.01)

(52) U.S. Cl.
  USPC .......................................................... 707/759

(58) Field of Classification Search
  USPC .......................................................... 707/759
  See application file for complete search history.

(56) References Cited

U.S. PATENT DOCUMENTS

| | | |
|---|---|---|
| 5,418,948 A | 5/1995 | Turtle |
| 5,873,076 A | 2/1999 | Barr et al. |
| 6,014,665 A | 1/2000 | Culliss |
| 6,078,916 A | 6/2000 | Culliss |
| 6,169,986 B1 * | 1/2001 | Bowman et al. ...................... 1/1 |
| 6,189,002 B1 * | 2/2001 | Roitblat ................................ 1/1 |
| 6,285,999 B1 * | 9/2001 | Page ..................................... 1/1 |
| 6,289,337 B1 | 9/2001 | Davies et al. |
| 6,430,552 B1 | 8/2002 | Corston-Oliver |
| 6,460,034 B1 * | 10/2002 | Wical ................................... 1/1 |
| 6,490,577 B1 | 12/2002 | Anwar |
| 6,523,026 B1 * | 2/2003 | Gillis ................................... 1/1 |
| 6,526,440 B1 | 2/2003 | Bharat |
| 6,529,903 B2 | 3/2003 | Smith et al. |
| 6,629,097 B1 * | 9/2003 | Keith .................................... 1/1 |
| 6,633,868 B1 * | 10/2003 | Min et al. ............................. 1/1 |
| 6,725,259 B1 | 4/2004 | Bharat |

(Continued)

OTHER PUBLICATIONS

Gerard Salton, Editor, Professor of Computer Science Cornell University, "The Smart Retrieval System—Experiments in Automatic Document Processing", Prentice-Hall, Inc., 1971, 556 pages.

(Continued)

Primary Examiner — Robert Beausoliel, Jr.
Assistant Examiner — Michael Pham
(74) Attorney, Agent, or Firm — Fish & Richardson P.C.

(57) ABSTRACT

A search query for a search engine may be improved by incorporating alternate terms into the search query that are semantically similar to terms of the search query, taking into account information derived from the search query. An initial set of alternate terms that may be semantically similar to the original terms in the search query is generated. The initial set of alternate terms may be compared to information derived from the original search query. One example of such information is a set of documents retrieved in response to a search performed using the initial search query. One or more of the alternate terms may be added to the original search query based on their relationship to the information derived from the original search query.

21 Claims, 4 Drawing Sheets

(56) References Cited

U.S. PATENT DOCUMENTS

| | | | |
|---|---|---|---|
| 6,772,150 | B1 | 8/2004 | Whitman et al. |
| 6,832,218 | B1 * | 12/2004 | Emens et al. ................... 1/1 |
| 6,941,293 | B1 | 9/2005 | Dean et al. |
| 8,055,669 | B1 | 11/2011 | Singhal et al. |
| 2001/0047271 | A1 | 11/2001 | Culbert et al. |
| 2002/0042923 | A1 | 4/2002 | Asmussen et al. |
| 2002/0059161 | A1 * | 5/2002 | Li ................... 707/1 |
| 2002/0059204 | A1 | 5/2002 | Harris |
| 2002/0103798 | A1 | 8/2002 | Abrol et al. |
| 2002/0123988 | A1 | 9/2002 | Dean et al. |
| 2002/0133481 | A1 | 9/2002 | Smith et al. |
| 2002/0138478 | A1 | 9/2002 | Schwartz et al. |
| 2003/0037058 | A1 | 2/2003 | Hatori |
| 2003/0130998 | A1 * | 7/2003 | Fox et al. ................... 707/3 |
| 2004/0059729 | A1 | 3/2004 | Krupin et al. |
| 2004/0158560 | A1 | 8/2004 | Wen et al. |
| 2004/0261021 | A1 | 12/2004 | Mittal et al. |

OTHER PUBLICATIONS

Jean Aitchison et al., "Thesaurus Construction—A Practical Manual", Aslib, 1972, 95 pages.

George A. Miller, "Wordnet: A Dictionary Browser", Proceedings of the First International Conference on Information in Data, University of Waterloo, 1985, pp. 25-28.

Julie Beth Lovins, "Development of a Stemming Algorithm", Mechanical Translation and Computational Linguistics, Electric Systems Laboratory, vol. 11, Nos. 1 & 2, Mar. and Jun. 1968, pp. 22-30.

Gerard Salton et al., "Improving Retrieval Performance by Relevance Feedback", Journal of the American Society for Information Science, Jun. 1990, pp. 288-297.

Mandar Mitra et al.: "Improving Automatic Query Expansion," *Proceedings of SIGIR '98*; pp. 206-214.

Robert Krovetz: "Viewing Morphology as an Inference Process," *Proc. 16th ACM SIGIR Conference*, Pittsburgh, Jun. 27-Jul. 1, 1993; pp. 191-202.

M.F. Porter. An algorithm for suffix stripping. Program. vol. 14, No. 3. 1980. pp. 130-137.

Chris Buckley et al.: "Automatic Query Expansion Using SMART: TREC 3," In Proceedings of the Third Text Retrieval Conference (TREC-3), Apr. 1995, 11 pages.

Gerard Salton et al.: "Introduction to Modern Information Retrieval," McGraw-Hill, 1983.

A Case Study in Web Search using Trec Algorithms. Amit Singhal, Marcin Kaszkiel. In Proceedings of the Tenth International World Wide Web Conference, pp. 708-716, 2001.

New Retrieval Approaches Using SMART: TREe 4. Chris Buckley, Amit Singhal, Mandar Mitra, (Gerard Salton). In Proceedings of the Fourth Text Retrieval Conference, NIST Special Publication 500-236, 25-48, 1996.

"The Anatomy of a Large-Scale Hypertextual Search Engine," 1998 by Sergey Brin and Lawrence Page, 23 pages.

Modern Information Retrieval: A Brief Overview. Amit Singhal. In IEE Data Engineering Bulletin 24(4), pp. 35-43, 2001.

http://www.washington.edu/computing/windows/issue18/web.tools.html, published 1996. "Web Search Tools Help You Find What You Want", 5 pages.

http://www.windweaver.com/searchhelper.htm, published 2000. "Search Helper: Windweavers' Easy Search", 6 pages.

* cited by examiner

| TERMS | WEIGHTS |
|---|---|
| Term 1 | Weight 1 |
| Term 2 | Weight 2 |
| Term 3 | Weight 3 |
|  |  |
| Term (M-1) | Weight (M-1) |
| Term M | Weight M |

Fig. 4

SEARCH QUERIES IMPROVED BASED ON QUERY SEMANTIC INFORMATION

RELATED APPLICATION

This application is a continuation of U.S. application Ser. No. 10/377,117, filed Mar. 3, 2003, the disclosure of which is incorporated herein by reference.

BACKGROUND OF THE INVENTION

A. Field of the Invention

The present invention relates generally to information location and, more particularly, to search engines that locate information on a network, such as the World Wide Web.

B. Description of Related Art

The World Wide Web ("web") contains a vast amount of information. Locating a desired portion of the information, however, can be challenging. This problem is compounded because the amount of information on the web and the number of new users inexperienced at web research are growing.

People generally surf the web based on its link graph structure, often starting with high quality human-maintained indices or search engines. Human-maintained lists cover popular topics effectively but are subjective, expensive to build and maintain, slow to improve, and do not cover all esoteric topics.

Automated search engines, in contrast, locate web sites by matching search terms entered by the user to a pre-indexed corpus of web pages. Generally, the search engine returns a list of web sites sorted based on relevance to the user's search terms. Determining the correct relevance, or importance, of a web page to a user, however, can be a difficult task. For one thing, the importance of a web page to the user is inherently subjective and depends on the user's interests, knowledge, and attitudes. There is, however, much that can be determined objectively about the relative importance of a web page. Existing methods of determining relevance are based on matching a user's search terms to terms indexed from web pages. More advanced techniques determine the importance of a web page based on more than the content of the web page. For example, one known method, described in the article entitled "The Anatomy of a Large-Scale Hypertextual Search Engine," (1998) by Sergey Brin and Lawrence Page, assigns a degree of importance to a web page based on the link structure of the web page.

A search query entered by a user is typically only one query of many that express the information that the user desires. For example, someone looking to buy replacement parts for their car may pose the search query "car parts." Alternatively, however, the search queries "car part," "auto parts," or "automobile spare parts" may be as effective or more effective in returning related documents. In general, a user query will have multiple possible alternative queries that could be helpful in returning documents that the user considers relevant.

Conventionally, additional search queries relating to an initial user query may be automatically formed by the search engine based on different forms of a search term (e.g. "part" or "parts") or based on synonyms of a search term (e.g., "auto" instead of "car"). This allows the search engine to find documents that do not contain exact matches to the user's search query but that are nonetheless relevant.

One known technique that finds alternative search queries related to the search query entered by the user is based on the concept of stems. A word stem is an underlying linguistic form from which the final form was derived by morphological linguistic processes. Techniques for identifying the stem of a word are well known in the field of computational linguistics. One such technique is described by Porter, M. F., 1980, *An Algorithm For Suffix Stripping*, Program, Vol 14(3):130-137. Words with the same stem, such as congress and congressional, tend to describe similar concepts. Stemming allows a search engine to match a query word to various morphological variants of that word. The search engine can use each of these variants in formulating the search query.

A second known technique that finds alternative search queries related to the search query entered by the user is based on the matching of query terms to their synonyms (e.g., car to automobile). The synonyms may be determined by looking up the terms in a thesaurus.

One serious problem with the stem-based and synonym-based techniques for finding additional search queries is that two words may have similar semantics in some contexts, but not in other contexts. For example, "automobile" has similar semantics to "car" in the query "Ford car", but not in the query "railroad car." As a result, these techniques often produce search queries that generate irrelevant results. For another example, if the query "jaguars" was stemmed to the word "jaguar," the query semantics may have been changed from that of animal to that of a popular car.

A third known technique that finds alternative search queries related to the search query entered by the user is based on finding additional terms that occur frequently in documents matching the original query, and adding one or more of the additional terms to the query. One serious problem with this technique is that it may introduce terms that change the focus of the query. For example, the word "drive" may be present in many documents matching the query "Ford car", but it would not be an appropriate addition to the query.

Accordingly, it would be desirable to more effectively expand search queries to find alternate search terms that encompass the semantic intent of the original search query without unduly changing its focus.

SUMMARY OF THE INVENTION

Aspects consistent with the present invention determine alternate terms for a search query that are semantically similar to the search query.

One aspect of the invention is directed to a method of modifying a search query. The method includes determining alternate terms that are related to terms in the search query and generating a query context based on the search query. The method further includes comparing the query context to the alternate terms to generate valid ones of the alternate terms and incorporating one or more of the valid ones of the alternate terms into the search query.

Another aspect of the invention is directed to a method for performing a search based on a search query. The method includes receiving the search query from a user, where the search query includes one or more search terms. The method further includes generating additional terms that are related to the one or more search terms, filtering the additional terms to remove those of the additional terms that are not semantically similar to the one or more search terms, and incorporating one or more of the non-removed additional terms into the search query.

Yet another aspect of the invention is directed to a search engine. The search engine includes a database configured to store an index of web documents and a ranking component configured to generate, in response to a modified search query, a list of documents that indexed in the database and that are relevant to the modified search query. The search engine further includes a query processing component. The query processing component is configured to determine alternate terms that are related to terms in an original search query, compare the alternate terms to information related to the original search query to generate valid ones of the alternate terms, and generate the modified search query by incorporating one or more of the valid ones of the alternate terms into the original search query.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 4 is a diagram illustrating an exemplary semantic concept vector.

DETAILED DESCRIPTION

The following detailed description of the invention refers to the accompanying drawings. The detailed description does not limit the invention. Instead, the scope of the invention is defined by the appended claims and equivalents.

As described herein, a search query is expanded to include additional terms or phrases that are similar or related to the terms in the initial search query that was received from the user. A list of possible "similar" terms can be located by, for example, stemming or synonym based techniques. A query context is built based on the initial search query. The query context may be defined by a set of documents that are relevant to the initial search query. A document may be deemed relevant to a search query if, for example, it is retrieved in response to the query. The additional terms or phrases may then be compared to the query context. Additional terms that are supported in the query context can be used to expand the initial search query while additional terms that are not supported may be discarded.

System Overview

Figure 1:
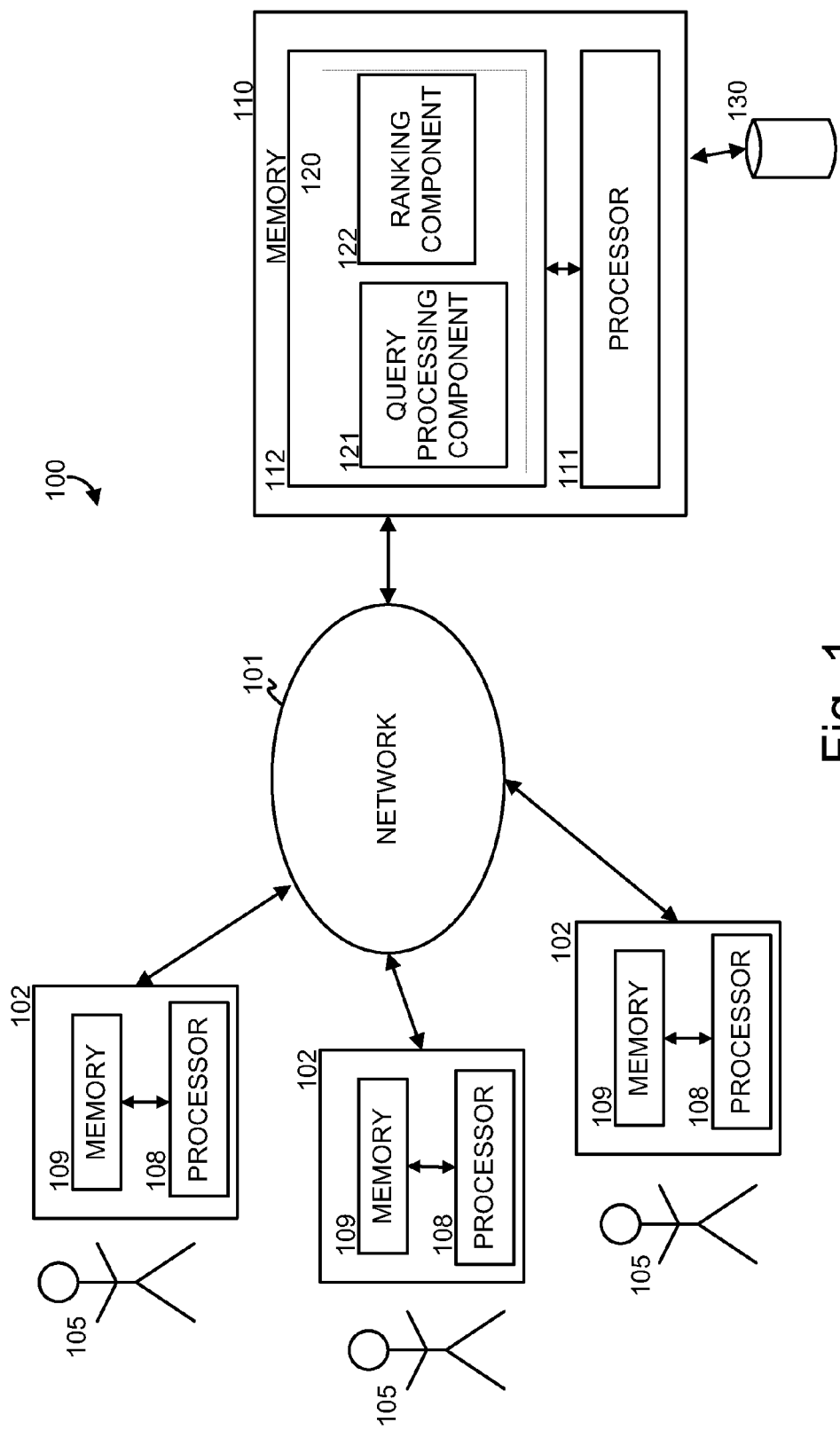
FIG. 1 is a diagram illustrating an exemplary network in which concepts consistent with the present invention may be implemented.

FIG. 1 is a diagram illustrating an exemplary system 100 in which concepts consistent with the present invention may be implemented. System 100 includes multiple client devices 102, a server device 110, and a network 101, which may be, for example, the Internet. Client devices 102 each include a computer-readable memory 109, such as random access memory, coupled to a processor 108. Processor 108 executes program instructions stored in memory 109. Client devices 102 may also include a number of additional external or internal devices, such as, without limitation, a mouse, a CD-ROM, a keyboard, and a display.

Through client devices 102, users 105 can communicate over network 101 with each other and with other systems and devices coupled to network 101, such as server device 110. In general, client device 102 may be any type of computing platform connected to a network and that interacts with application programs, such as a digital assistant or a "smart" cellular telephone or pager.

Similar to client devices 102, server device 110 may include a processor 111 coupled to a computer-readable memory 112. Server device 110 may additionally include a secondary storage element, such as database 130.

Client processors 108 and server processor 111 can be any of a number of well known computer processors, such as processors from Intel Corporation, of Santa Clara, Calif. Server 110, although depicted as a single computer system, may be implemented as a network of computer processors.

Memory 112 may contain a search engine program 120. Search engine 120 may include a query processing component 121 and a ranking component 122. Search engine 120 locates relevant information in response to search queries from users 105. In particular, users 105 send search queries to server device 110, which responds by returning a list of relevant information to the user 105. Typically, users 105 ask server device 110 to locate web documents relating to a particular topic and stored at other devices or systems connected to network 101. Query processing component 121 assists search engine 120 in locating relevant information by preprocessing a search query and potentially expanding the search query to include additional terms (or phrases) that are semantically similar to the terms in the initial query.

Ranking component 122 may generate a list of relevant documents based on the user search query or based on a version of the search query after modification by query processing component 121. The list may be ordered by relevance. "Relevance" in this context may be defined based on factors including, but not limited to, the proximity between query words in the returned documents (e.g., documents in which the query words are close to each other may be considered more relevant) and the order of the words in the returned document (e.g., documents in which the query words are in the same order as in the query phrase may be considered more relevant). The returned list of documents may be extracted from a pre-indexed corpus of web documents, which may be stored in database 130. In general, processes for indexing web documents and searching the indexed corpus of web documents to return relevant documents is well known in the art. Accordingly, the functionality of ranking component 122 will not be described further herein.

Operation of the Query

Processing Component

Figure 2:
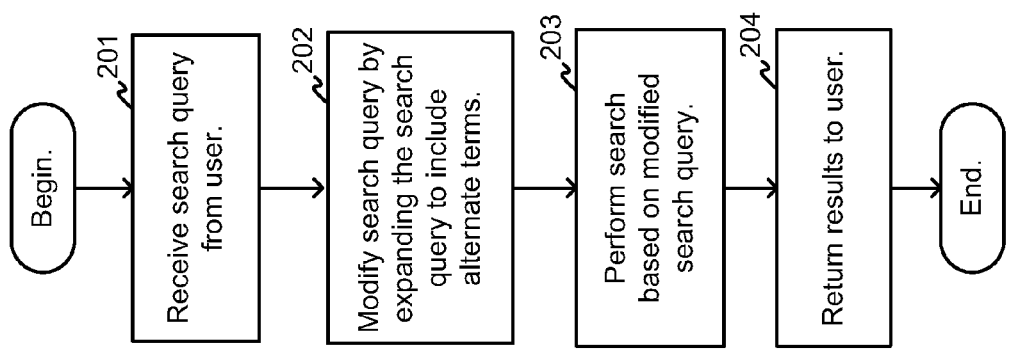
FIG. 2 is a flow chart illustrating a search performed consistent with aspects of the invention.

FIG. 2 is a flow chart illustrating a search performed consistent with aspects of the invention. To begin, search engine 120 may receive a search query from a user 105 (Act 201). Query processing component 121 may modify the search query to additionally include alternate terms that are semantically related (i.e., semantically similar) to the terms in the received search query (Act 202). Based on the modified search query, ranking component 122 generates a list of documents relevant to the user search query (Act 203). The list of documents may be ranked based on relevance. The list of documents, or a subset of the list (e.g., the first 20 documents), may then be returned to the user (Act 204).

Figure 3:
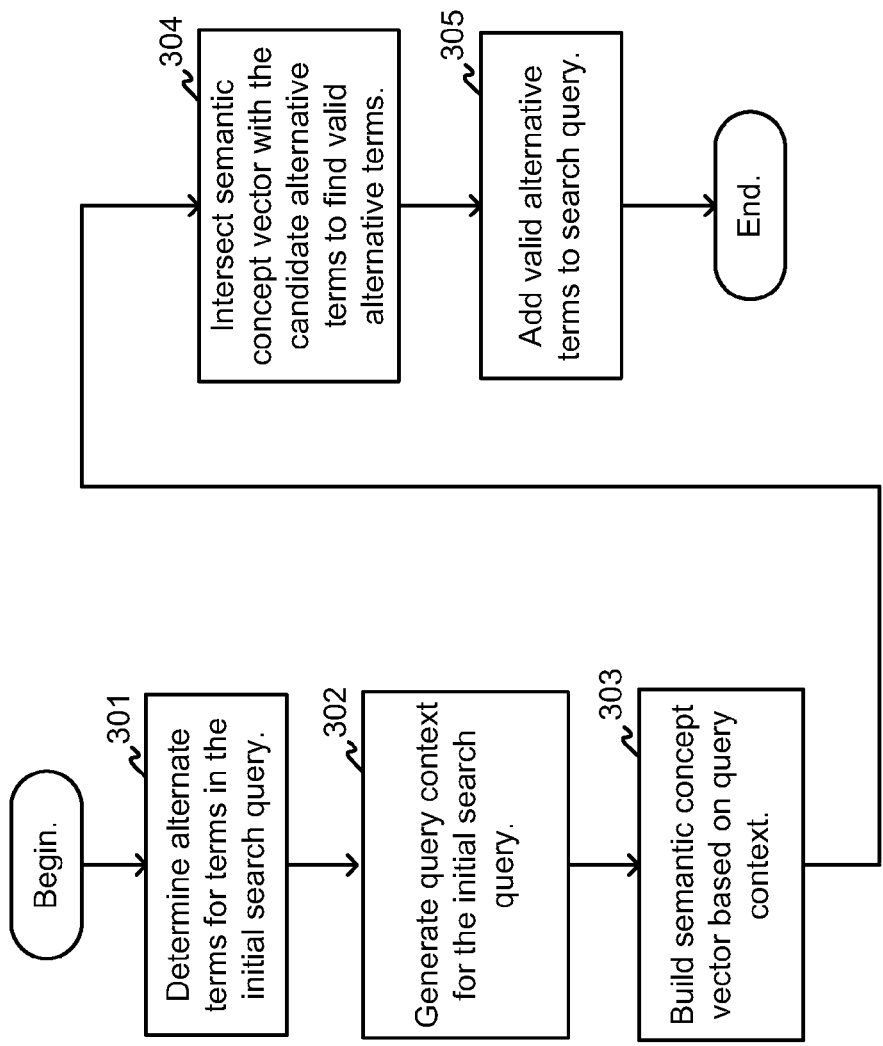
FIG. 3 is a flow chart illustrating operation of the query processing component shown in FIG. 1.

FIG. 3 is a flow chart illustrating operation of query processing component 121 in performing Act 202. Query processing component 121 may begin by determining alternate terms (or phrases) for terms (or phrases) in the initial query received from the user (Act 301). The alternate terms can be determined using a number of possible techniques, such as stemming and/or thesaurus lookup, or other method for finding related terms.

In the stemming technique, terms that have the same stem as a term in the initial search query are included as possible alternate terms. A word stem is an underlying linguistic form from which the final form was derived by morphological linguistic processes. In one implementation, described in the previously referenced publication by M. F. Porter, an algorithm for suffix stripping is used to identify a stem of a word. Thus, if one of the initial search terms is "running," then the terms "run," "runner," and "runnable" may all be included as possible alternatives for "running" Query processing component 121 may find these alternate stem terms based on a dictionary lookup, such as for example, by searching for all words in a dictionary that have the same stem as the term to be matched.

In the thesaurus lookup technique, a thesaurus may be used to find synonyms to use as possible alternate terms. For example, for a search term, such as "run," the thesaurus lookup may return a number of possible synonyms, such as "flee," "retreat," and "escape." Other thesaurus-like techniques may be used additionally or alternatively in place of a traditional thesaurus lookup. The WordNet™ project, for example, is a lexical reference system whose design is inspired by current psycholinguistic theories of human lexical memory. In WordNet™, English nouns, verbs, adjectives and adverbs are organized into synonym sets, each representing one underlying lexical concept. When using WordNet™, hypernyms of a word to a query (e.g., alcohol is a hypernym of wine) and/or hyponyms (e.g., burgundy is a hyponym of wine) can be used to generate terms related to the initial query. WordNet™ is developed by the Cognitive Science Laboratory of the Princeton University.

As explained above, related terms determined using stemming techniques or thesaurus lookup techniques may be, but are often not similar in semantic context to the original terms on which they are based. Thus, such techniques can also frequently generate non-relevant terms and non-relevant search results.

In addition to determining the possible alternate terms to the user query, query processing component 121 may also generate a set of documents that define a "query context" for the initial search query (Act 302). Act 302 may be performed simultaneously with, before, or after Act 301. In one implementation, the query context may be a set of documents returned by ranking component 122 based on the initial user search query. The set of documents may be limited to the most relevant N documents returned by ranking component 122. In one implementation N is set between 30 to 50 documents, although in other implementations, other values of N may be used.

Because the query context is based on the original search query, words that occur often in the top N ranked documents returned for the original search query are likely to be related to the semantic meaning of the query. A semantic concept vector may be built by query processing component 121 based on the set of N documents that form the query context (Act 303).

FIG. 4 is a diagram illustrating an exemplary semantic concept vector 400. Vector 400 includes a number of terms 401-1 through 401-M, where M is equal to the number of terms across all of the N documents in the query context. That is, for each different term in the N documents, an entry 401 may be added to vector 400. Each entry 401 is associated with a weight 402 (shown as weights 402-1 through 402-M).

Weights 402 may be calculated using a number of possible techniques. One technique for generating weights 402 bases the weights on the number of documents in which the term occurs. That is, in this technique, each weight 402 may be set equal to the number of documents of the N documents in which the term occurs. More advanced weighting techniques, such as a weight based on the inverse document frequency (idf), may also be used.

The inverse document frequency (idf) of a term may be defined as a function of the number f of documents in the collection in which the term occurs and the number J of documents in the collection. In the context of a web search engine, the collection may refer to the set of web documents (e.g., web pages) indexed by the search engine. More specifically, the idf may be defined as log $$\left(\frac{J}{f+1}\right).$$

Higher idf values indicate that a term is relatively more important than a term with a lower idf value. For a web search engine, J may be on the order of 1 billion documents.

If tf is the frequency (i.e., the number of occurrences) of the term in a document, then w(tf) may be the tf weight of the term in that document. More specifically w(tf) may be just the tf itself, or 1+log(tf), or tf/(1+tf), or any other formulation. The weight of a term for any particular document of the N documents may be defined as:

$$w(tf) \cdot idf, \tag{1}$$

Each weight 402 may then be calculated as the sum of the weights calculated using formula (1) for each document in the set of the N documents in the query context. With this weighting technique, terms used multiple times or in multiple documents are given more weight than terms used once. Also, terms that are relatively less common are given more weight.

Semantic concept vector 400 may be pruned to remove terms that do not have a sufficient presence in the top documents of the query context. In one implementation, terms that occur in less than a predetermined percentage (e.g., 5%, but at least 2 documents) of the documents in the query context are removed from vector 400. Alternatively, terms that appear with sufficient weight in such a threshold number of the above documents, terms that have a sufficient summed weight across all or some subset of the N documents, or any other criteria may be determined semantically valid in the context of the original query and retained, while other terms are removed. "Removing" a term may be accomplished by setting the weight of the term to zero. In another implementation, terms with a weight less than a predetermined threshold are deleted.

Query processing component 121 may next intersect semantic concept vector 400 with the alternate terms determined in Act 301 to obtain valid alternate terms (Act 304). The intersection may be performed in a number of ways. For example, alternate terms that are also present in semantic concept vector 400 with a non-zero weight may be considered valid alternate terms. Alternatively, the non-zero weight may be compared to a threshold value, and only possible alternate terms that correspond to a weight above the threshold value may be considered valid alternate terms. In either of the implementations, Act 304 serves to filter out potential alternate terms that may not be semantically similar to the terms in the original search query.

Query processing component 121 may next expand the original search query by adding the valid alternate terms to the search query (Act 305). In one implementation, this Act is performed by logically ORing the valid alternate terms with their corresponding original terms. For example, assume the original search query is "unix systems administrators" and the valid alternate terms are "system," "administration," "administer," and "administrators." In this situation, the modified search query may be: "unix (systems OR system) (administration OR administrators OR administer OR administrator)."

The operations shown in FIG. 3, as described above, allow essentially any technique to be used to initially generate potentially semantically similar terms for a search query. In Acts 302-304, these initially generated terms are filtered to remove non-semantically similar terms. In other words, Acts 302-304 boost confidence that the remaining valid alternate terms are truly semantically similar.

Alternative Implementations

One of ordinary skill in the art will recognize that the techniques described above for determining alternate terms for terms in the initial search query, generating the query context, and building the semantic concept vector, may be modified to include a number of alternative implementations. For example, the query context was described as a number of documents located based on a search using the original search query. However, the query context, and hence the semantic concept vectors, can be derived from a number of other sources. For example, the query context may be formed based on a matching of the current query to a log of saved queries. Documents that were returned for logged queries that are similar to the current query may be used to form the query context.

Still further, the semantic concept vectors can be generated directly from terms culled from a log of saved queries that are similar to the current query. As yet another example, documents returned based on a search performed using the original search query may be first clustered based on similarity. The query context may then be formed based on some or all of the clusters. As another example, overlapping document sets can be used to infer semantic similarity. Thus, if similar document sets are returned for two different search queries, the terms in the search queries may be determined to contain semantically similar content.

Still further, a set of candidate semantic context vectors can be pre-computed by forming clusters of similar documents or similar queries, computing context vectors for those clusters, and then selecting one or more context vectors that contain many of the words of the query.

The semantic context vector may include information in addition to the occurrences of words in the set of documents retrieved by the original query. For example, it may also include information about the occurrences of phrases or of pairs of nearby words in the set of documents retrieved by the original query. For example, it may include information about all pairs of words that occur within three words of each other in the set of documents retrieved by the original query. This additional information may be used to further prune the words to be added to the query. For example, if a first word of the original query occurs in many nearby pairs with a second word of the original query, but an alternate form of the first word does not occur in many nearby pairs with any other word of the original query, then the alternative form of the first word may be excluded from the extended query. For example, if the alternative form of the first word occurs less than 20% as often in nearby pairs with other words of the original query as does the original form of the first word, then the alternative form may be excluded from the extended query.

The semantic context vector may be used to adjust the expansion of the query, for each document, so that different extensions are applied to different documents. In one style of adjustment, for example, the words in the semantic context vector are compared with the words of a document. If the document contains few of the words of the semantic context vector, then the original query is used to decide if the document should be included in the query results, while if the document contains many of the words of the semantic context vector, then the expanded query is used to decide if the document should be included in the query results. The document could be considered to have many of the words of the semantic context vector if, for example, the dot product of the document word vector and the semantic context vector is at least as great as one half of the average of the dot product of the semantic context vector and the document word vector of the documents or set of documents retrieved by the original query.

A vector, called a semantic concept vector, was described above as storing contextual information describing semantic context. However, such information may be stored in forms other than vectors. An example of such an alternate representation may be a generalized Document Object Model containing structured information related to user queries.

One of ordinary skill in the art will recognize that there are also different possible ways of obtaining synonyms and related words for a search term. In general, user interactions with a search engine can allow the discovery of words that are associated with other words; for example, words may be changed by a user to another word. Such user interactions may include recent and/or previous interactions by the particular user whose query is being improved, or may include interactions by one or more other users (by, for example, examining query logs and/or aggregate user interaction data). These other words can be treated as related. Additionally, anchor-text in web pages may be used to determine synonym pairs. For example, if two anchors differ in, say, just one word, or in just a preset number of words, the differing words can be treated as related to each other. Words that tend to appear within a same set of words in a corpus can be considered related to each other. For example, singular value decomposition of a document-term matrix may be used to compute related terms, statistical analysis of collocations of terms in documents may be employed, etc. etc. Machine translation techniques can be used to determine related words. Also, spelling correction techniques may be used to determine when two words are related, as can a thesaurus or any manually/automatically generated list of synonyms. The examples provided here illustrate only a few of the many techniques known to those of ordinary skill in the art that may be employed to obtain related words for a term.

CONCLUSION

Techniques for determining alternate terms for a search query were described herein. The alternate terms may be initially generated using, for example, stemming techniques or thesaurus lookup techniques. These terms are then filtered to remove alternate terms that are not semantically in the context of the initial search query.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while systems and methods have been described in the context of a web document search engine, the systems and methods are not so limited. In fact, systems and methods consistent with the present invention may be used in any environment where it is desirable to retrieve relevant documents in response to a search query.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A computer-implemented method comprising:
receiving, by a search system, a search query;
generating, by the search system, a potential substitute term that is related to a query term of the search query;
identifying, by the search system, an original set of documents that are responsive to the search query;
weighting each potential substitute term that appears in a document in the original set based on a prevalence of the potential substitute term in the original set of documents;
producing a pruned set of terms whose weight satisfies a condition;
determining that the potential substitute term is a member of the pruned set of terms; and
in response to determining that the potential substitute term is a member of the pruned set of terms, modifying, by the search system, the search query to include the potential substitute term.

2. The method of claim 1, further comprising performing a search for documents based on the modified search query.

3. The method of claim 1, wherein the pruned set of terms contains terms whose weight is greater than zero.

4. The method of claim 1, wherein the pruned set of terms contains terms whose weight is greater than a threshold weight.

5. The method of claim 1, wherein a number of documents in the original set of documents is limited to a specific number of the most relevant documents.

6. The method of claim 1, wherein weighting each potential substitute term comprises using inverse document frequency to measure the prevalence of the substitute term.

7. The method of claim 1, wherein weighting each potential substitute term comprises using a number of times the potential substitute terms appears in the original set of documents to measure the prevalence of the substitute term.

8. A system comprising:
one or more computers and one or more storage devices storing instructions that are configured, when executed by the one or more computers, to cause the one or more computers to perform operations comprising:
receiving a search query;
generating a potential substitute term that is related to a query term of the search query;
identifying an original set of documents that are responsive to the search query;
weighting each potential substitute term that appears in a document in the original set based on a prevalence of the potential substitute term in the original set of documents;
producing a pruned set of terms whose weight satisfies a condition;
determining that the potential substitute term is a member of the pruned set of terms; and
in response to determining that the potential substitute term is a member of the pruned set of terms, modifying the search query to include the potential substitute term.

9. The system of claim 8, wherein the operations further comprise performing a search for documents based on the modified search query.

10. The system of claim 8, wherein the pruned set of terms contains terms whose weight is greater than zero.

11. The system of claim 8, wherein the pruned set of terms contains terms whose weight is greater than a threshold weight.

12. The system of claim 8, wherein a number of documents in the original set of documents is limited to a specific number of the most relevant documents.

13. The system of claim 8, wherein weighting each potential substitute term comprises using inverse document frequency to measure the prevalence of the substitute term.

14. The system of claim 8, wherein weighting each potential substitute term comprises using a number of times the potential substitute terms appears in the original set of documents to measure the prevalence of the substitute term.

15. A non-transitory computer-readable storage device storing software comprising instructions executable by one or more computers which, upon such execution, cause the one or more computers to perform operations comprising:
receiving a search query;
generating a potential substitute term that is related to a query term of the search query;
identifying an original set of documents that are responsive to the search query;
weighting each potential substitute term that appears in a document in the original set based on a prevalence of the potential substitute term in the original set of documents;
producing a pruned set of terms whose weight satisfies a condition;
determining that the potential substitute term is a member of the pruned set of terms; and
in response to determining that the potential substitute term is a member of the pruned set of terms, modifying the search query to include the potential substitute term.

16. The non-transitory computer-readable storage device of claim 15, wherein the operations further comprise performing a search for documents based on the modified search query.

17. The non-transitory computer-readable storage device of claim 15, wherein the pruned set of terms contains terms whose weight is greater than zero.

18. The non-transitory computer-readable storage device of claim 15, wherein the pruned set of terms contains terms whose weight is greater than a threshold weight.

19. The non-transitory computer-readable storage device of claim 15, wherein a number of documents in the original set of documents is limited to a specific number of the most relevant documents.

20. The non-transitory computer-readable storage device of claim 15, wherein weighting each potential substitute term comprises using inverse document frequency to measure the prevalence of the substitute term.

21. The non-transitory computer-readable storage device of claim 15, wherein weighting each potential substitute term comprises using a number of times the potential substitute terms appears in the original set of documents to measure the prevalence of the substitute term.

* * * * *